United States Patent Office 3,159,778
Patented Dec. 1, 1964

3,159,778
SYSTEM FOR PRODUCING VARIABLE FREQUENCY SIGNALS REPRESENTING A PATTERN TRACING
Vladimir Gavreau, Albert Calaora, and Marcel Miane, all of Marseille, France, assignors to Centre National de la Recherche Scientifique, Paris, France, a state administration
Filed Nov. 1, 1960, Ser. No. 66,477
Claims priority, application France Nov. 3, 1959
6 Claims. (Cl. 318—162)

In our prior British patent application No. 13818/58 and U.S. Patent application No. 732,783, filed on April 30, 1958, we have described a first system which permits of recording, for example on a single track of a magnetic tape, a reference current of constant frequency and at least one other current of variable frequency, the algebraic difference between the variable frequency and the constant frequency being dependent, at every moment, on the speed of displacement of a control member of a machine-tool (or other industrial machine) during the course of manufacture by an operator of a part to be machined in mass production, and also a second system which employs the recording obtained by means of the first system for controlling at least one control member of a machine-tool in order that it may reproduce the cycle of movements carried out by the operator, which permits the automatic manufacture of the desired number identical parts in conformity with the initial part machined by the operator.

The present invention relates to an improvement in such recording systems, in order to permit a recording suitable for controlling a machine-tool, not from a part actually machined by an operator, and which for that reason may not be perfect, but directly from a drawing or a model, the periphery or the outline of which are followed by the operator by means of a sighting member.

The device according to the present invention permits of decomposing the movement of the sighting member along the periphery or outline of drawing or the model into components and produces currents (two in the preferred case of a plane curve) of variable frequency with respect to the constant frequency of a reference current, the said variable-frequency currents being adapted to be employed to effect the control of a machine-tool, either directly or preferably through the intermediary of a recording which will subsequently be reproduced as many times as may be required.

The advantages of the device according to the present invention are immediately apparent, since it is only necessary to draw a piece on a large scale, after which the manufacture of this piece can be carried out by mass-production methods without having to resort to the use of a piece machined by an operator.

The invention will be more clearly understood by reference to the description which follows and to the accompanying drawings, the description and drawings being especially given by way of indication and not of limitation.

FIG. 1 diagrammatically illustrates, in perspective view, a device according to the invention having two dark chambers which convert the movements of a sighting device along an outline into variations of frequency of two currents.

Figure 3:
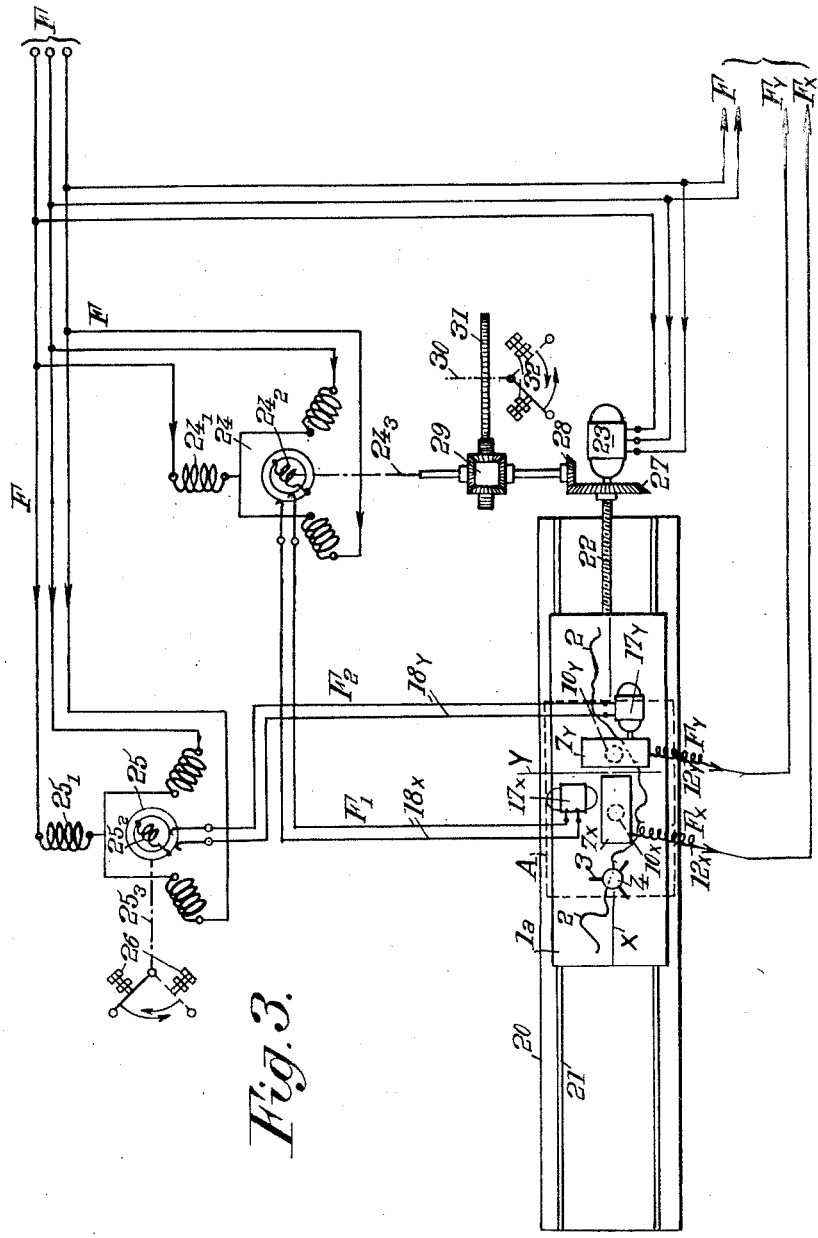
FIG. 3 illustrates the general diagram of the device according to the present invention, provided with a system for compensating for the play and/or the displacements as a whole of the outline and of the sighting device, employing selsyns connected to operate as rotary phase-shifting transformers.
Figure 4:
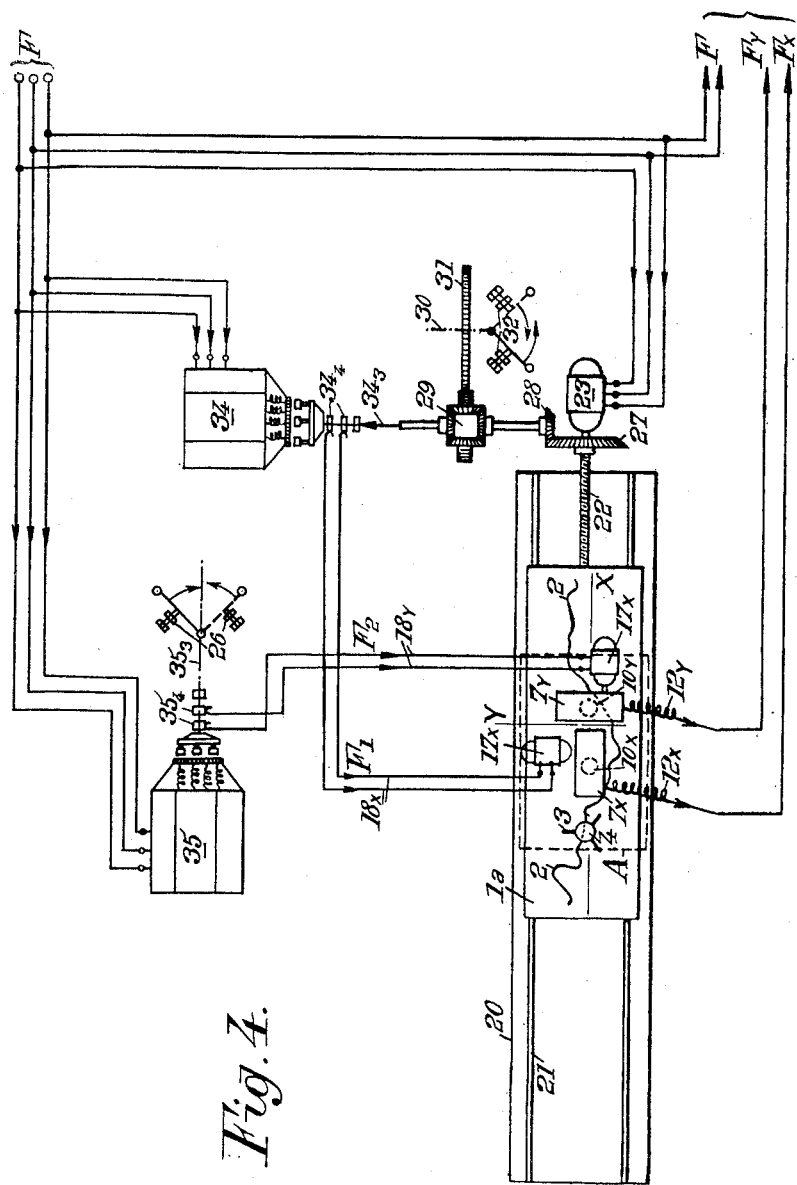

Finally, FIG. 4 is a diagram similar to that of FIG. 3 but employing converters with fixed commutators and rotating brushes.

Figure 1:
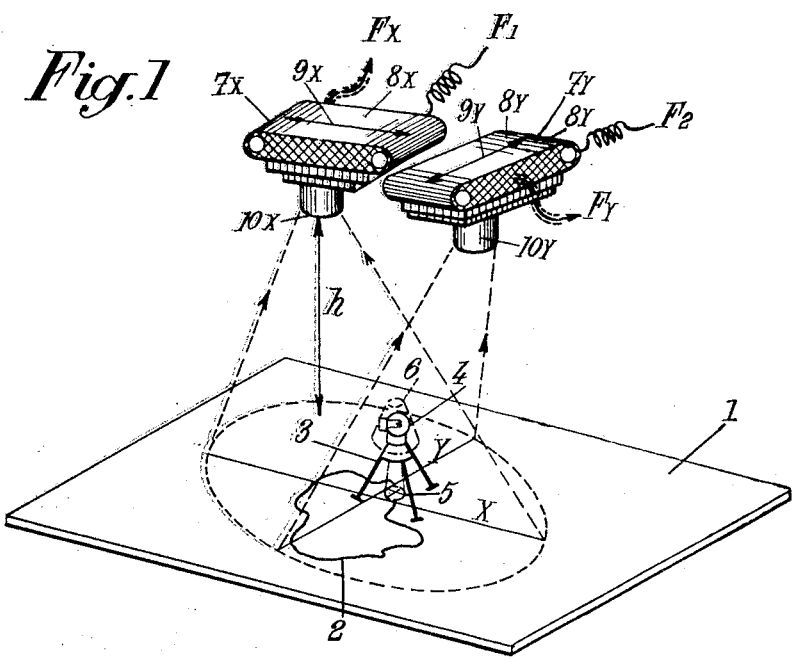

In the preferred form of embodiment illustrated in FIG. 1, the device according to the invention for controlling machine-tools from a drawing or a model comprises:

A board or table 1, on which is fixed the drawing or model to be followed, said drawing having an outline 2;

A sighting device adapted to move along this outline 2 and constituted by a tripod 3 which carries, on the one hand a source of light 4 of very small size (formed for example by the filament, having an area of 2 x 2 mm., of an incandescent lamp) and on the other hand, a crossed wire the image of which is projected at 5 in the plane of the extremities of the feet of the tripod, that is to say on table 1; the tripod also preferably carries a shade to keep the light from the lamp 4 away from the eyes of the operator who follows outline 2;

Two identical dark chambers $7_X$ and $7_Y$ supported in fixed positions by means of supports (not shown) at a distance $h$ (for example of the order of 2 metres) from table 1. These dark chambers, which are similar to the casings of small photographic cameras, are arranged with their bases $8_X$ and $8_Y$ parallel to table 1 and the main axes $9_X$ and $9_Y$ of their bases perpendicular to each other, respectively in the direction of axes X and Y shown on the drawing or model.

Figure 2:
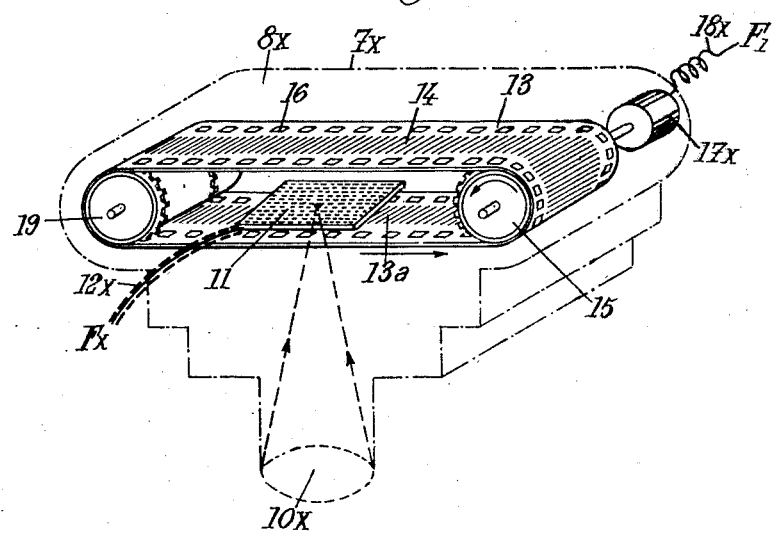
FIG. 2 is also a rough perspective view on a larger scale of one of the dark chambers of FIG. 1 together with the parts contained in the said chamber.

Each chamber such as $7_X$ (FIG. 2), comprises:

A photographic lens $10_X$ ($10_Y$);

A photo-electric cell 11, for example of the type having a stopping layer, fixed in position in the casing and delivering through conductor $12_X$ a current $F_X$ variable with the illumination;

An endless band or strip 13 comprising a series of narrow parallel zones which are alternately opaque and transparent (for example a series of opaque lines 14 drawn on a transparent strip, for example by photographing on a 35 mm. film, a series of uniformly-spaced lines);

Driving members for driving band 13 at constant speed, these members comprising for example a toothed drum 15 co-operating with marginal perforations 16 in band 13 and driven in rotation at constant speed by a synchronous motor $17_X$ through a speed-reduction gearing (not shown), said motor being supplied from a line $18_X$ with current of generally constant frequency $F_1$, and a toothed return drum 19.

Lens $10_X$ forms image 5 in the plane of the lower portion 13a of band 13, and photo-electric cell 11 receives the light modulated by the passage of this band.

In a particular embodiment, we employed a lamp 4 of 250 watts, lenses $10_X$ and $10_Y$ having a focal distance of 75 mm. and an aperture of 1:3.5, a distance $h$ equal to 195 cm., drums 15 and 19 having a diameter of 35 mm. being mounted on ball bearings and having a speed of rotation of the order of 4 to 5 r.p.m. and a number of lines per millimeter (approximately ten) corresponding to a speed of passage of 50 lines per second, so that the cells 11 of the dark chambers $7_X$ and $7_Y$ deliver a current of 50 or 60 cycles per second when the tripod is stationary, that is to say of a frequency of the same order of magnitude as that of the main supply system.

By reason of the fixed positions of dark chambers $7_X$ and $7_Y$, the passage of transversely-lined band 13 in front of the cell 11 of casing $7_X$ takes place in the direction of axis X, whereas the passage of the band of casing $7_Y$ takes place constantly in the direction of axis Y.

When sighting device 3 in the form of a tripod remains stationary, the image of light source 4 is fixed and the photo-electric cell of each of the dark chambers supplies a current of constant frequency (equal to the frequency of passage of the lines on the band). The frequency of this current increases when sighting device 3, and therefore the image of light source 4, is moved in the direction opposed to that of the movement of the band; it diminishes when the sighting device moves in the same direction as the band. On the other hand, when sighting device 3 (and therefore the image of light source 4) moves parallel to the lines, that is to say perpendicularly to the direction of movement of the band, the frequency of the current supplied by the photo-electric cell remains equal to the reference frequency.

It will be clear that with the two dark chambers $F_X$ and $F_Y$, one with a band moving parallel to the X axis and the other with a band parallel to the Y axis, the movement of the sighting device or tripod 3 is automatically decomposed into variations of the co-ordinates X and Y, which respectively result in variations of the frequencies $f_x$ and $f_y$ of the currents $F_X$ and $F_Y$ supplied by the two photo-electric cells 11, arranged in the casings $7_X$ and $7_Y$, to conductors $12_X$ and $12_Y$.

In FIGS. 3 and 4, we have shown a device according to FIG. 1 provided with means for taking-up play and also with means permitting automatic compensation of the displacements of the outline to be reproduced, this being an advantage in the case of drawings of large size, since the take-up of play and the compensation of the displacements is effected by a suitable de-phasing of the currents $F_1$ and $F_2$ fed to synchronous motors $17_X$ and $17_Y$ respectively.

In FIGS. 3 and 4 (in which the arrangement of FIG. 1 is shown, employing the same reference numbers: tripod 3 with lamp 4, dark chambers $7_X$ and $7_Y$ with lenses $10_X$ and $10_Y$, and synchronous motors $17_X$ and $17_Y$ supplied through the conductors $18_X$ and $18_Y$), the outline 2 to be explored is fixed on a sliding board 1a which is movable on a supporting table 20 provided with slides 21 under the control of a lead-screw 22 driven by a motor 23 supplied for example with the current F of the three-phase main supply system.

The field of lenses $10_X$ and $10_Y$ has been shown by a rectangle A in broken lines. If curve 2 is not wholly included within this field, we may use a compensating system which enables the curve 2 to be explored step by step by sighting device 3 by moving the board 1a once or several times (with the tripod 3 in position on it) on slides 21 by means of motor 23.

This compensation and take-up of the mechanical play are obtained by making use of de-phasing systems which vary the phase of the currents $F_1$ and $F_2$ (applied through conductors $18_X$ and $18_Y$ to synchronous motors $17_X$ and $17_Y$) in response to the displacements of board 1 and to the mechanical play.

Two embodiments of these de-phasing systems have been illustrated, one by FIG. 3 and the other by FIG. 4.

In the embodiment of FIG. 3, use is made of phase-shifting selsyns 24 and 25, the three-phase stators $24_1$ and $25_1$ of which are supplied directly with three-phase current F from the supply mains, while the windings $24_2$ and $25_2$ of the rotors $24_3$ and $25_3$ supply the currents $F_1$ and $F_2$ which are applied to the synchronous motors $17_X$ and $17_Y$ respectively.

Selsyn 25, which relates to the Y values in the case of the arrangement shown by FIG. 3, corrects only the mechanical play in the corresponding control means. The rotation of its rotor $25_3$, which may be effected either manually or by a small motor, is limited by stop-screws 26.

The angular offsetting is introduced when sighting device 3 is moved in one direction (rotation of the selsyn rotor until it is stopped by the corresponding stop screw) and is eliminated when the sighting device is to be moved in the other direction (rotation of the rotor until it is stopped in the other direction by the corresponding stop screw), the positions of the stop-screws being determined by experiment, and varying only very slightly and very slowly during the manufacture of a series of pieces, as a result of mechanical wear of the various parts.

In the contrary, selsyn 24, which relates to the X values, compensates for both the mechanical play and the movements of the sliding board 1a. To this effect, the rotor $24_3$ of selsyn 24 is driven by conical pinions 27 and 28 which transmit thereto, through differential gear 29, the rotation of the auxiliary motor 23 which controls the displacements of the board 1a through lead-screw 22.

The direction of rotation of the synchronous motor $17_X$ driving the striated band of dark chamber $7_X$ is such that the frequency $f_x$ of the current $F_X$ delivered by the corresponding photo-electric cell increases when sighting device 3 moves towards the right with respect to the drawing and decreases when the sighting device moves towards the left, while the direction of rotation of the rotating field of the correcting selsyn 24 is such that the frequency of the current $F_1$ fed to the synchronous motor $17_X$ increases when the drawing mounting board 1a is moved towards the left.

Under these circumstances, when the board 1a is moved towards the left by means of auxiliary motor 23, and when at the same time sighting device 3 is moved towards the left as a whole, together with the board:

The frequency of the current $F_1$ and in consequence the speed of rotation of motor $17_X$ increase;

The frequency $f_x$ of the current $F_X$ supplied by the photo-electric cell of dark chamber $7_Y$ becomes lower than the frequency $F_1$.

It is therefore only necessary to design the pinions 27 and 28 driving the rotor $24_3$ of selsyn 24 in such manner that when board 1a is displaced, with sighting device 3 resting upon it, the frequency $f_x$ of $F_X$ remains equal to the frequency $f$ of the supply system (for example 50 cycles), and in this case the resultant current $F_X$ will not cause any movement to be made by the machine-tool in the direction of the X axis.

Owing to this arrangement, it is possible to bring the different portions of a large-scale drawing having an outline 2 of elongated shape in the direction of the X axis successively into the zone A which is explorable by sighting device 3, while maintaining the source of light 4 in the field of the lenses $10_X$ and $10_Y$, by simply sliding board 1a in the direction of the X axis.

The corrections which enable the mechanical play to be taken up are obtained from the same selsyn 24 by causing the rotation of its rotor $24_3$ by the shaft 30 of toothed wheel 31 which engages differential 29, the displacements corresponding to these corrections being limited by stop-screws 32 which play the same part concerning the corrections along the X axis as the stop-screws 26 concerning corrections along the Y axis.

The embodiment shown by FIG. 4 is similar to that of FIG. 3 (the same reference numbers having been used to indicate the same parts) except for the fact that, in order to produce the necessary de-phasing for taking up play (along both the X axis and the Y axis) and to compensate for the displacements of board 1, use is made of phase-shifting transformers not of the selsyn type but of the type having fixed commutators and rotating brushes.

Converters of this type are shown at 34 and 35. These play exactly the same part as selsyns 24 and 25 respectively and their primary windings are supplied with three-phase current F from the mains supply, the secondary windings supplying the synchronous motor $17_X$ and $17_Y$ through conductors $18_X$ and $18_Y$ respectively with monophase currents $F_1$ and $F_2$ which are de-phased when so required.

In transformers of this kind, the stator of a three-phase motor is employed as the primary, while the part of the secondary winding is played by a rotor of a universal motor fixed in this stator, the two windings of this rotor being respectively connected to the even numbered commutator bars and to the odd numbered commutator bars of said fixed commutator, on which rotate brushes $34_4$ and $35_4$ supplying synchronous motors $17_X$ and $17_Y$.

For this reason, in this embodiment, the phase-shifts necessary for taking up the play and/or for compensating the movements of board 1 are effected for each transformer by rotating brushes $34_4$ and $35_4$ mounted on shafts $34_3$ and $35_3$, the commutator being fixed.

As in the case of the circuit shown in FIG. 3, the dephasing for the Y axis is limited by two stop-screws 26, while the de-phasing for the X axis is limited by the stop-screws 32 for taking up play, and can be controlled by means of pinions 27 and 28 from the motor 23 controlling the displacements of the board 1a, all through a differential 29.

It will be clear from the two embodiments shown by FIGS. 3 and 4 that the take-up of play and/or compensation for the displacements of table 1a and of sighting device 3 are effected automatically and that three currents are obtained, namely a reference current F of substantially constant frequency $f$, and two currents $F_X$ and $F_Y$ of variable frequencies $f_x$ and $f_y$, the differences $f_x-f$ and $f_y-f$ being proportional to the speeds of movement in the direction of the X axis and of the Y axis respectively of sighting device 3 along outline 2. It is only necessary to record these three frequencies as indicated in the previously-mentioned patent application in order to obtain a recording which, by the system of reproduction also described in the aforementioned patent applications, permits the automatic machining of a series of parts having the outline 2 with take-up of all the mechanical play.

It will of course be understood that the invention is in no way limited to the forms of embodiment which have been described above; on the contrary, the scope of the invention includes all the alternative forms within the limits of the appended claims.

What we claim is:

1. A device for automatically obtaining, for all the points, successively, of a given curve traced on the plane surface of a member, currents proportional respectively to the components of the tangent to said curve at said points, which device comprises, in combination, means adapted to be actuated by an operator for projecting a light spot onto said curve, two cameras fixed above said surface, each of said cameras comprising a lens forming an image of said spot in an image plane fixed with respect to said camera, said image plane being parallel to said plane surface, a flat photo-electric cell having its surface located in said image plane, electric means operative by said cell for producing an electric current in response to the illumination of a point of said cell by an image formed on said cell of the light spot on said plane surface, an endless band of a transparent material movable in said camera, a portion of said endless band being interposed between said lens and said photo-electric cell and being parallel thereto, and electric motor means for driving said endless band at a constant speed, said band being provided with a multiplicity of equidistant opaque lines, transverse to the direction of movement of said band, whereby, in response to the projection on said band portion of a light spot having no displacement transverse to said opaque lines, a current of fixed frequency is delivered by said electric means but the projection on said band portion of a light spot having displacements transverse to said opaque lines causes said electric means to deliver current of varying frequency, the respective directions of movement of said endless band portions of said two cameras being at right angles to each other, means operative respectively by the variable frequency currents produced by said electric means, respectively, for delivering currents proportional, at any time, to the frequencies at said time of said variable frequency currents.

2. A device for automatically obtaining, for all the points, successively, of a given curve traced on the plane surace of a member, currents proportional respectively to the components of the tangent to said curve at said points, which device comprises, in combination, means adapted to be actuated by an operator for projecting a light spot onto said curve, two cameras fixed above said surface, each of said cameras comprising a lens forming an image of said spot in an image plane fixed with respect to said camera, said image plane being parallel to said plane surface, a flat photo-electric cell having its surface located in said image plane, electric means operative by said cell for producing an electric current in response to the illumination of a point of said cell by an image formed on said cell of the light spot on said plane surface, an endless band of a transparent material movable in said camera, a portion of said endless band being interposed between said lens and said photo-electric cell and being parallel thereto, and electric motor means for driving said endless band at a constant speed, said band being provided with a multiplicity of equidistant opaque lines, transverse to the direction of movement of said band, whereby, in response to the projection on said band portion of a light spot having no displacement transverse to said opaque lines, a current of fixed frequency is delivered by said electric means but the projection on said band portion of a light spot having displacements transverse to said opaque lines causes said electric means to deliver current of varying frequency, the respective directions of movement of said endless band portions of said two cameras being at right angles to each other, means operative respectively by the variable frequency currents produced by said electric means, respectively, for delivering currents proportional, at any time, to the frequencies at said time of said variable frequency currents, said last mentioned means including a generator producing a three-phase reference current of fixed frequency and means for comparing each of said variable frequency currents with said fixed frequency current, two phase-shifting transformers each comprising a stationary three-phase primary winding and a single-phase secondary winding rotatable with respect to said primary winding, both of said stationary primary windings being connected with said generator to be fed with current therefrom, said two secondary windings being connected with said two electric motor means respectively, for feeding current thereto, and means for applying two angular settings to said two rotatable windings respectively, to take up mechanical play.

3. A device according to claim 2 wherein each of said phase-shifting transformers consists of a selsyn device comprising a stationary stator carrying said primary winding and a rotating rotor carrying said secondary winding.

4. A device according to claim 2 wherein each of said phase-shifting transformers consists of a rotary transformer comprising a stationary commutator carrying said primary winding and rotating brushes fixed in rotation to said secondary winding.

5. A device according to claim 2 where said member having a plane surface on which said curve is traced is movable, further comprising means for compensating simultaneous displacements of said member and of said light spot projecting means, said compensating means comprising means for displacing said movable member in at least one direction and means for acting on the angular setting of the rotatable secondary winding of at least one of said phase-shifting transformers in response to the displacements of said movable member so that the frequency of the current in said direction does not vary during a simultaneous displacement of said movable member and of said light spot projecting means.

6. A device according to claim 5 further comprising, for simultaneously applying to the rotatable secondary winding of each of said phase-shifting transformers an angular displacement to take up mechanical play in each given direction and an angular displacement to compensate for simultaneous displacements of said member and of said light spot projecting means, means comprising a differential gear device having a first input shaft, a second input shaft and an output shaft, said output shaft being operatively connected with the rotatable secondary winding of one of said transformers to rotate together therewith, said first input shaft being coupled to said means for displacing said movable member and said second input shaft being coupled to said angular setting means.

References Cited in the file of this patent

UNITED STATES PATENTS

| | | |
|---|---|---|
| 2,537,770 | Livingston et al. | Jan. 9, 1951 |
| 2,777,354 | Stickney et al. | Jan. 15, 1957 |
| 2,806,986 | Luhn | Sept. 17, 1957 |
| 2,851,643 | Limberger | Sept. 9, 1958 |
| 2,895,053 | Franck et al. | July 14, 1959 |

FOREIGN PATENTS

| | | |
|---|---|---|
| 760,321 | Great Britain | Oct. 31, 1956 |